M. RIESNER.
AIR AND GAS COMPRESSOR.
APPLICATION FILED APR. 6, 1911.

1,092,396.

Patented Apr. 7, 1914.

Witnesses:
W. H. Kennedy
J. A. Graves

Inventor:
Michael Riesner
by his Attys:
Philipp Sawyer Rice & Kennedy

UNITED STATES PATENT OFFICE.

MICHAEL RIESNER, OF CINCINNATI, OHIO, ASSIGNOR TO INTERNATIONAL STEAM PUMP COMPANY, A CORPORATION OF NEW JERSEY.

AIR AND GAS COMPRESSOR.

1,092,396. Specification of Letters Patent. Patented Apr. 7, 1914.

Application filed April 6, 1911. Serial No. 619,204.

*To all whom it may concern:*

Be it known that I, MICHAEL RIESNER, a citizen of the United States, residing at Cincinnati, county of Hamilton, and State of Ohio, have invented certain new and useful Improvements in Air and Gas Compressors, fully described and represented in the following specification and the accompanying drawings, forming a part of the same.

This invention relates to a novel construction and arrangement of valve chambers and valves, intended especially for air and gas compressors, but which may be used also in other pumps for gases or liquids.

The chief object of the invention is to provide a construction, by which the large number of valves required for high speed valve area are provided for in such a manner as to produce a simple, compact and strong compressor head with the minimum clearance spaces.

In the accompanying drawings forming a part of this specification, there are shown for purpose of illustration, a high pressure gas compressor, embodying all the features of the invention in their preferred form, and a modified construction embodying the broader features of the invention, and these constructions will now be described in detail, and the features forming the invention then specifically pointed out in the claims.

Figure 1:
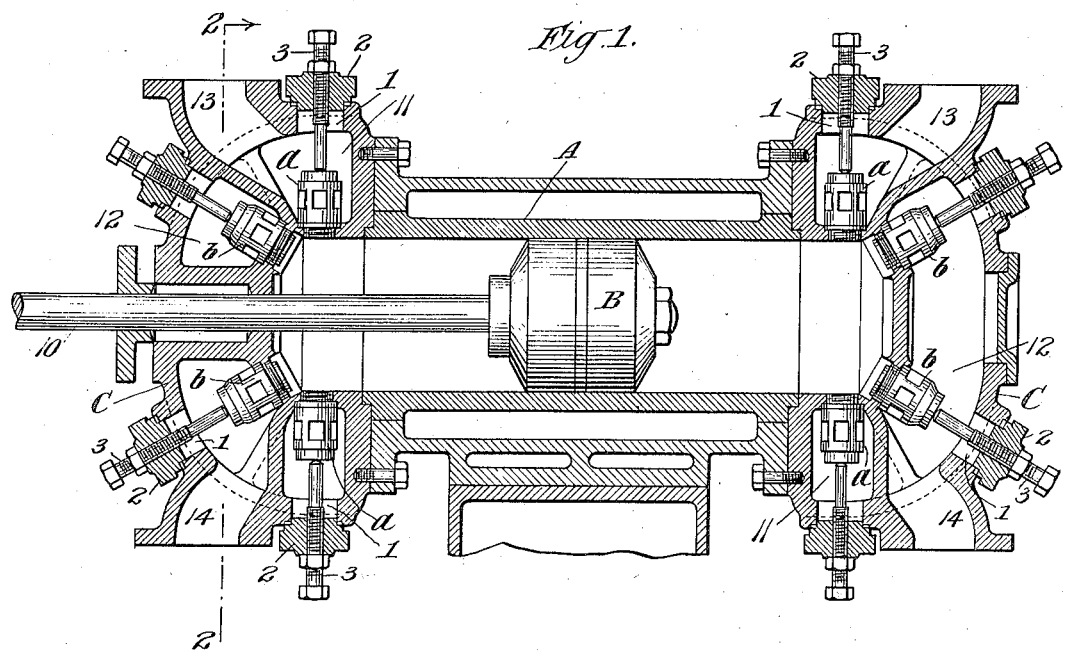
Figure 2:
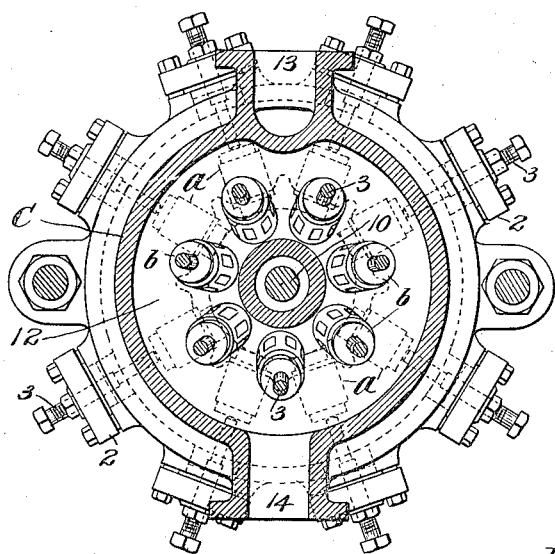

In the drawings, Figure 1 is a longitudinal central section of a double acting compressor designed especially for high pressures. Fig. 2 is a cross section on the line 2 of Fig. 1.

Referring to the drawings, A is the compressor cylinder, B the compressor piston having a piston rod 10, and C the compressor heads at opposite ends of the cylinder, the cylinder being shown as having the usual jacket and the heads bolted thereto. The heads C have inner and outer annular valve chambers 11, 12, the inner valve chamber 11 extending about the cylinder end with an annular set of valves *a* opening radially to the cylinder, and with the outer valve chamber 12 at the end of the cylinder with an annular set of valves *b* opening longitudinally, or approximately longitudinally, of the cylinder. In the construction shown the inner valve chamber 11 is the delivery chamber connecting with the delivery 13, and the outer chamber 12 is the inlet or suction chamber connecting with the suction 14, but it will be understood that these parts may be reversed, the inner chamber 11 being used for suction with its inlet at 13 or arranged in any other suitable manner.

The valves are indicated as of a common type of automatic valves, but valves of any suitable form may be used. Each of the valves is readily accessible through openings 1, closed by caps 2 in which the screw abutments 3 for the valve casings are mounted.

It will be seen that the invention provides an arrangement of valve chambers and valves, by which the large valve area and free flow required is secured in a very compact construction with minimum clearance spaces, and which is excellently adapted for high pressures. The compressor dimensions both radially and longitudinally of the cylinder are as small as possible, the radial valves coming within the cylinder longitudinal dimension, and the longitudinal valves within the cylinder radial dimension, so that no increase of size for cylinder and valve chamber capacity, above that necessary for the desired capacity of the cylinder and the suction and delivery chambers, is required.

What I claim is:—

1. A pump cylinder having a cylinder head formed separately from and attached to the cylinder, said head being formed to provide suction and delivery chambers extending about the end of the cylinder and said head carrying valves arranged in annular sets, one set of valves being arranged circumferentially about the end of the cylinder and opening radially to the cylinder, and the other set being arranged at the end of and opening in line with the cylinder.

2. A pump cylinder having a cylinder head formed separately from and attached to the cylinder, said head being formed to provide an annular suction chamber and an annular delivery chamber at the end of the cylinder, one of said chambers extending circumferentially about the end of the cylinder and having in the head an annular set of valves opening radially to the cylinder, and the other chamber arranged at the end of the cylinder and having in the head an annular set of valves opening in line with the cylinder.

3. A cylinder head formed separately from the cylinder and having valve chambers extending circumferentially of and in line with the cylinder and annular sets of valves, one set opening radially and the other in line with the cylinder.

4. Cylinder head C formed separately from the cylinder and having valve chamber 11, extending about the cylinder with valves opening radially to the cylinder, and valve chamber 12 in line with the cylinder having valves opening in line with the cylinder.

In testimony whereof, I have hereunto set my hand, in the presence of two subscribing witnesses.

MICHAEL RIESNER.

Witnesses:
 WILLIAM GOODMAN,
 HERMANN MUELLER.